4 Sheets—Sheet 1.

J. RIGBY.

PROCESS AND APPARATUS FOR MANUFACTURING ILLUMINATING GAS.

No. 7,590. Reissued April 3, 1877.

Witnesses;

Harry C. Clark

Manuel B. Stallings

Inventor

James Rigby, by H. W. Beadle Esq.

Atty.

J. RIGBY.

PROCESS AND APPARATUS FOR MANUFACTURING ILLUMINATING GAS.

No. 7,590. Reissued April 3, 1877.

Witnesses;

Harry C. Clark

Wm. H. Stallings

Inventor:

James Rigby.

by H. W. Beadle Jr.

Atty's.

J. RIGBY.

PROCESS AND APPARATUS FOR MANUFACTURING ILLUMINATING GAS.

No. 7,590. Reissued April 3, 1877.

Witnesses;

Harry S. Clark.

Marnie B. Stallings

Inventor.

James Rigby by H. W. Beadle & Co.

Attys.

4 Sheets—Sheet 4.

J. RIGBY.

PROCESS AND APPARATUS FOR MANUFACTURING ILLUMINATING GAS.

No. 7,590. Reissued April 3, 1877.

Fig. 8. a

Fig. 10. a

Witnesses;
Harry C. Clark
Mamie A. Stallings

Inventor.
James Rigby.
by H. W. Beadle Res.
Attys.

UNITED STATES PATENT OFFICE.

JAMES RIGBY, OF MONTREAL, QUEBEC, CANADA.

IMPROVEMENT IN PROCESSES AND APPARATUS FOR MANUFACTURING ILLUMINATING-GAS.

Specification forming part of Letters Patent No. 186,692, dated January 30, 1877: reissue No. 7,590, dated April 3, 1877; application filed March 12, 1877.

*To all whom it may concern:*

Be it known that I, JAMES RIGBY, a citizen of the United States, now residing in Montreal, Quebec, Canada, have invented a new and useful Improvement in Process and Apparatus for Manufacturing Illuminating-Gas from Petroleum; and I do hereby declare that the following is a full and exact description of the same, reference being had to the accompanying drawings, and letters of reference marked thereon.

This invention consists, mainly, first, in an improved method or process of making or treating gas, consisting, essentially, in subjecting the gas, after it leaves the retort, to the action of live and superheated steam, as will be hereinafter fully explained; and, second, in the construction of the apparatus employed to carry my method practically into effect.

Figure 1:
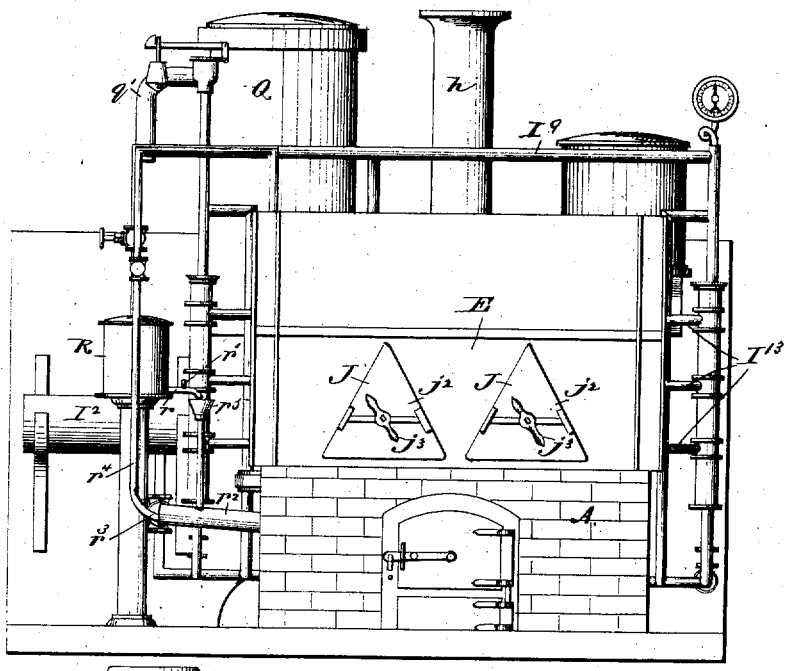
Figure 2:
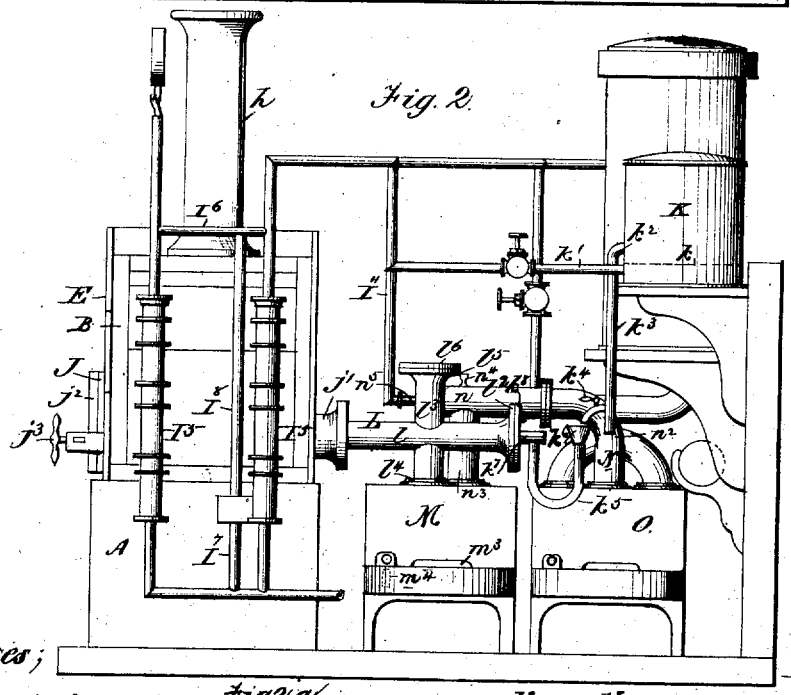
Figure 2A:
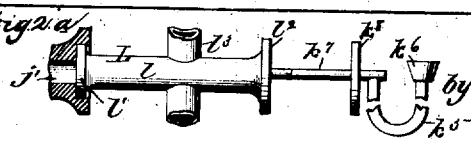
Figure 3:
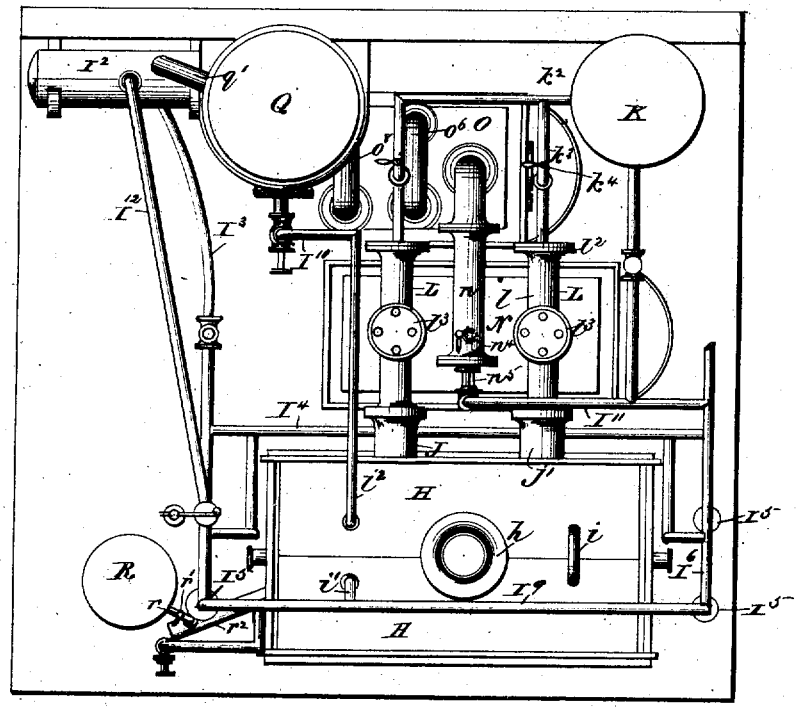
Figure 4:
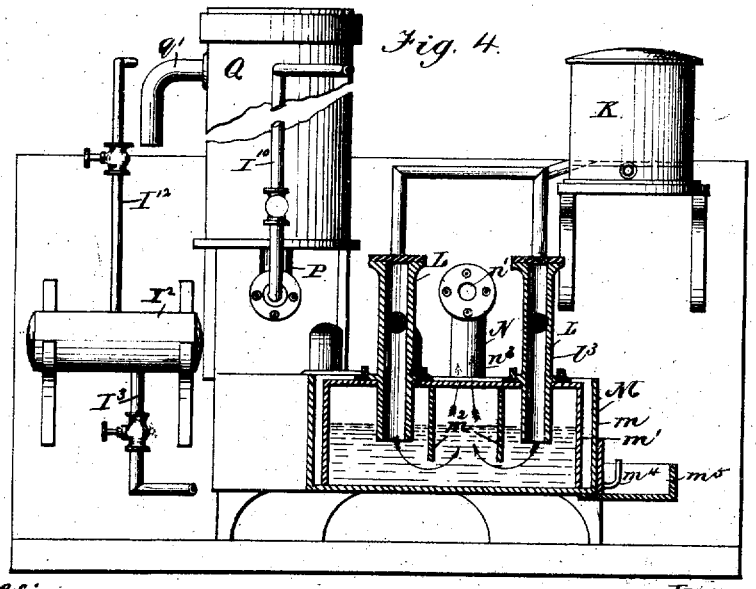
Figure 5:
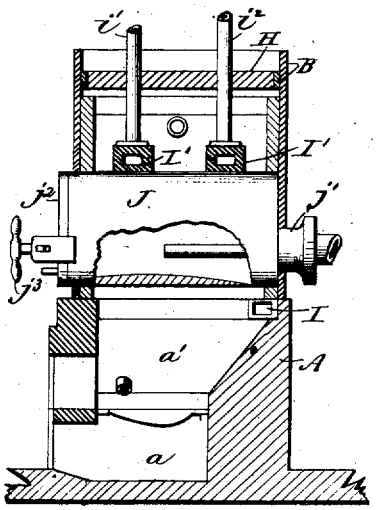
Figure 6:
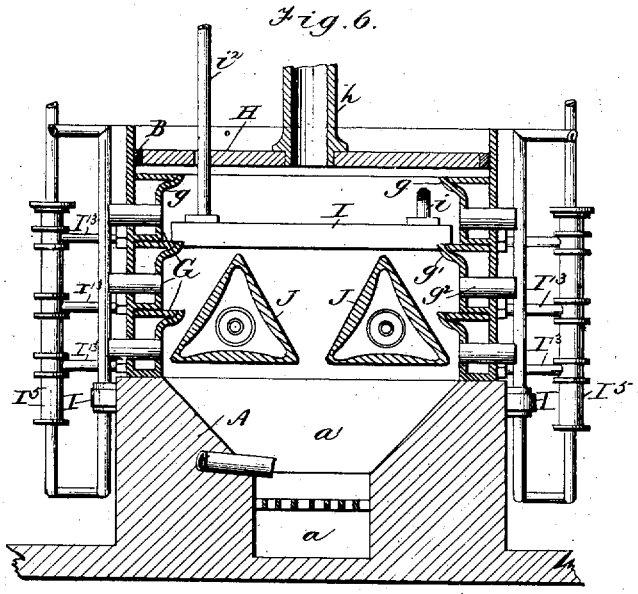
Figure 6:
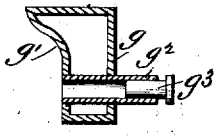
Figure 6:
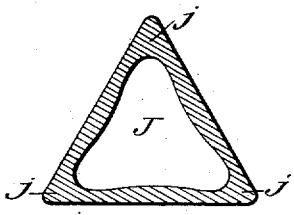
Figure 7:
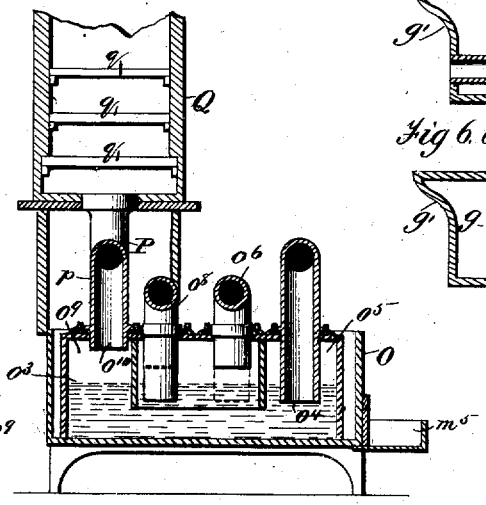
Figure 7:
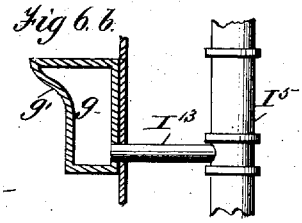
Figure 7:
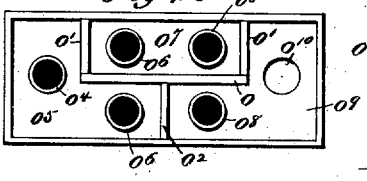
Figure 7:
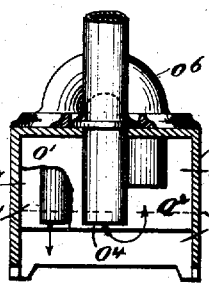
Figure 7:
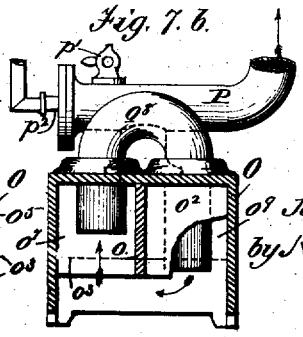
Figure 8:
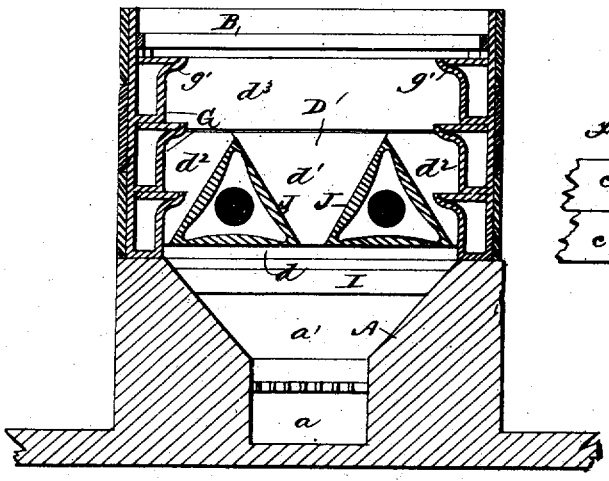
Figure 8:
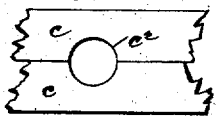
Figure 9:
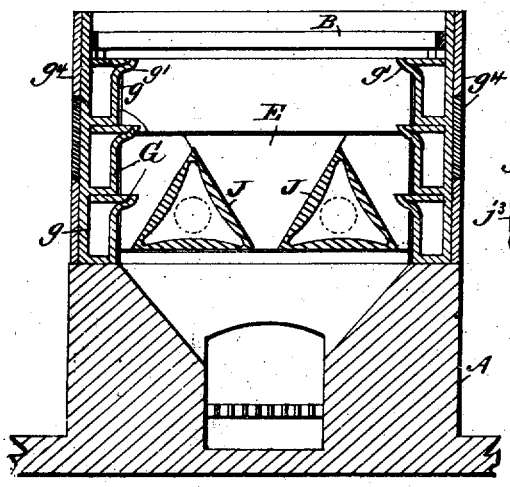

In the drawings, Figure 1 represents a front elevation of my improved apparatus; Fig. 2, a side elevation of the same; Fig. 3, a plan view; Fig. 4, a front elevation of the rear portion of the apparatus, with the first washer-box in section; Fig. 5, a longitudinal vertical section of the furnace; Fig. 6, a transverse sectional elevation of the same; Fig. 7, a partial sectional elevation of the second washer-box and scrubber; Fig. 8, a transverse vertical sectional elevation of the furnace, showing the inner wall of the back of the furnace in front elevation; Fig. 9, a transverse vertical sectional elevation of the furnace, showing the inner wall of the front of the furnace in rear elevation; and Fig. 10, a longitudinal vertical section of the furnace.

To enable others skilled in the art to make and use my invention, I will now proceed to describe fully its construction and manner of operation.

A general description of the method employed may be as follows:

The petroleum or other hydrocarbon is first subjected to the action of a high heat to transform it into gas; and then to the action of live steam, to throw down its heavier impurities, while, at the same time, it is diluted with atmospheric air. It is then further subjected to the action of a washing agent, and also to that of superheated steam, after which it is again washed, and finally purified, ready for use.

The apparatus employed to carry the method practically into effect is constructed substantially as follows:

For convenience and clearness of description it will be referred to under several heads, as follows: First, the furnace; second, the steam-generators and their connection; third, the retorts; fourth, the oil-tank and the pipes for delivering the oil to the retorts; fifth, the dip-pipes and the first washer; sixth, the first injector; seventh, the second washer; eighth, the second injector; ninth, the scrubber; tenth, the fuel-injector.

1. *The furnace.*—A represents the base of the furnace, consisting, preferably, of brick-work or masonry, constructed generally in any proper manner, and of any suitable size, which is provided with the ash-pit $a$ and fire-chamber $a^1$, as shown.

B, Figs. 2, $10^a$, $10^b$, represents a frame-work of angle-iron resting on the brick-work, by means of which the main portions of the superstructure are supported and held in place.

Figure 10:
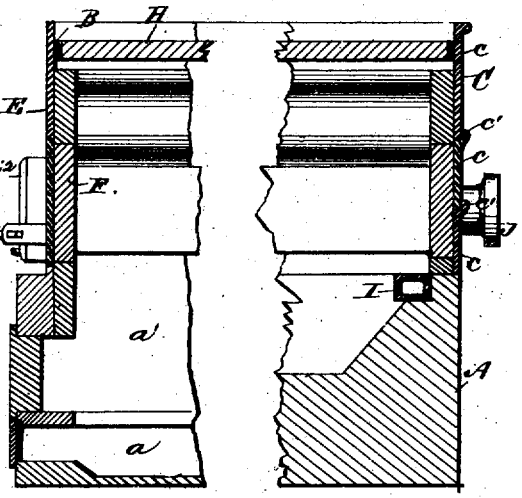
Figure 10:
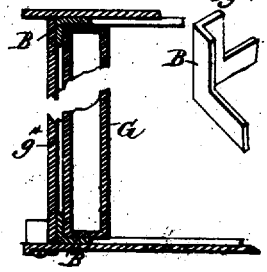

C, Fig. 10, represents the outer wall of the back of the superstructure, consisting of a series of similar independent covering-plates, $c$ $c$, having overlapping beads $c^1$ $c^1$, and also, at proper points, semicircular recesses $c^2$ $c^2$, Fig. $8^a$, adapted to inclose the necks of the retorts, as shown.

D, Fig. 8, represents the inner wall of the back of the superstructure, consisting of a rectangular metal block or make-up plate, $d$, of proper construction and size, which rests upon the brick wall and supports the rear ends of the retorts, as shown, triangular blocks or make-up plates $d^1$ $d^2$ $d^2$ adapted in form to fill the spaces above the retorts, and a rectangular block or tile, $d^3$, adapted to fill the remaining space, as shown.

E, Figs. 1 and 10, represent the outer wall of the front of the superstructure, which is constructed in a similar manner to the back previously described, with the exception that the openings for the retorts are triangular in form.

F represents the inner wall of the front, which is constructed in a similar manner to the inner wall of the back, previously described.

G G, Figs. 6, 8, and 9, represent the inner walls of the sides of the superstructure, consisting of a series of independent hollow blocks or water-backs, *g g*, of rectangular form, which are sustained below by the brick-work, and rest one upon the other, as shown.

$g^1$ represents a curved deflecting block or plate cast upon the face of the water-back, by means of which the flame and heat rising from the fire-chamber are thrown toward the retort, as shown.

$g^2$ $g^2$, Fig. $6^a$, represent tubes having proper stoppers $g^3$, as shown, which former extend through the water-backs for the purpose of permitting the interior of the furnace to be readily observed.

$g^4$ $g^4$, Fig. 9, represent the outer walls of the sides of the superstructure, consisting of a series of plates having proper openings, which may be secured in place in any suitable manner.

H H, Fig. 3, represent the top plates or tiles of the furnace, and *h* the smoke-stack, through which the products of combustion are conveyed to any proper point and discharged.

The purpose of the described construction will be readily understood. The furnace is divided into two parts, a base and superstructure, the former of which is permanent in its character, while the latter is made in sections, so that those parts liable to destruction contained therein may be readily removed and others inserted without disturbing other portions, and without materal loss of time.

The furnace is so constructed, also of independent sectional parts, adapted to fit together, that it may be readily erected by unskilled labor.

Its sections also are of such character that any suitable number of them may be grouped together to form a furnace of any desired size, extension readily being made, if desired, either in a vertical or horizontal direction.

2. *The steam-generators and their connections.*—I, Figs. 5 and 8, represents a water-bridge, extending longitudinally across the furnace near the rear wall of the same, which consists of a rectangular hollow casting or box, having inlet and outlet openings at each end, as shown in Fig. 6. $I^1$ $I^1$ represent iron superheating-chambers located in the furnace above the retorts, and provided at their ends with proper openings, two of which are connected by the circulation-pipe *i*, Fig. 3, and the other two, respectively, with the inlet and outlet pipes $i^1$ $i^2$, as shown.

$I^2$ represents the supply-tank, to which water is furnished in any suitable manner, and from any proper source.

$I^3$ represents the supply-pipe leading from the tank, which directly, and by means of the branch $I^4$, Fig. 3. communicates with the stand-pipes $I^5$ $I^5$ upon each end of the furnace, as shown.

$I^6$ $I^6$, Fig. 2, represent branches above, connecting the stand-pipes, and $I^7$ $I^8$ branches leading into and from the ends of the water-bridge, as shown.

$I^9$ represents a branch extending longitudinally across the furnace and connecting the upper ends of the stand-pipes, which communicates also with the inlet-pipe *i* of the first superheating-chamber, as shown.

$I^{10}$ represents a continuation of the outlet-pipe of the second superheater, which terminates in an injector, the purpose of which will be fully described hereinafter.

$I^{11}$ represents a live-steam pipe extending from one of the stand-pipes, which terminates also in an injector, which will be fully referred to hereinafter.

$I^{12}$ represents a branch live-steam pipe extending from the upper end of the stand-pipes to the water-supply tank, as shown.

$I^{13}$ $I^{13}$, Figs. 6 and $6^b$, represent short branches uniting the stand-pipes to the water-backs for the purpose of permitting constant circulation through them to take place.

By means of the described system the pressure in the tank is equalized, and the water contained therein consequently permitted to flow freely to the furnace, so the same water-level is maintained in each. Hence it follows that the upper tiers of water-backs and the upper portions of the system in consequence of their location above the supply-tank are never supplied with water, but receive steam only, which latter is delivered to the superheaters, and also conveyed away to other proper parts, as has been heretofore described in detail. The connections are such that a perfect circulation of water and steam occurs throughout all the system. Either live or superheated steam may be obtained, according to the place in the system from which it is drawn, the pipe $I^{11}$, which supplies the first injector, furnishing live steam, and the pipe $I^{10}$, which supplies the second injector, furnishing superheated steam. A certain portion of hydrogen formed in the superheater by the decomposition of steam passes also through this latter pipe to the second injector, for mixture with the hydrocarbon gas. By the employment of the water-bridge and the water-backs, arranged as described, a very large surface is advantageously exposed to the action of the heat, so that steam can be rapidly generated by the fire employed to heat the retorts. This system is supplied, of course, at the proper points with suitable cocks and the usual safety appliances, such as gages, safety-valves, &c.

3. *The retorts.*—J J represent the retorts, constructed preferably of such form that their cross-section is an equilateral triangle, they being, in this respect, similar to those described and claimed in my Letters Patent No. 135,666.

They differ, however, in this, that they are provided with an excess of metal, $j$, Fig. $5^a$, at their inner angles, for the purpose of giving them increased strength on these lines, and have also, on each inner face, the metal so disposed as to form a central swell or projection, with lines gradually inclining in a downward direction toward the sides and ends, as shown.

$j^1$ represents a circular neck, extending from the rear end, which is provided with a mouth or flange, adapted to receive the upper ends of the dip-pipes, as shown.

$j^2$ represents a lid, of any suitable construction, and $j^3$ proper fastening devices, for securing it properly in place.

These retorts, being constructed with sides of identical form, are each capable of being turned, for the purpose of exposing, successively, each side to the direct action of the heat, by which means its time of service is increased threefold.

The metal also is so disposed that the greatest thickness occurs where it is most needed—that is, on the angle-lines and at the center of each inner face, while the remaining portions are made thinner, for the purpose of economizing material and saving weight.

By means of the inclined surface also of the inner faces the oil which enters the retort at its center is distributed to every part.

4. *The oil-tank and the pipes for delivering the oil to the retorts.*—K represents a tank, of any proper construction and suitable size, into which the oil is introduced, in any proper manner.

$k$ represents a false bottom, and $k^1$ a pipe, discharging into the chamber formed thereby, by means of which live steam from the generators may be introduced in cold weather, for the purpose of keeping hydrocarbon in a fluid condition.

If desired, however, a coil may be substituted for the chamber described.

$k^2$, Fig. 3, represents a pipe having branches $k^3$ $k^3$, of any suitable number, controlled by proper stop-cocks $k^4$ $k^4$, by means of which the oil is drawn from the tank, and conveyed to the proper points $k^5$, Figs. 2 and $2^a$, represents a siphon-pipe, which is provided at one end with a funnel, $k^6$, suitably located to receive the oil from the pipes $k^3$, and is connected at the other to a horizontal pipe-length, $k^7$, as shown.

This pipe-length is attached near its outer end to a blank or cover plate, $k^8$, removably secured to the adjacent flange of the dip-pipe, and is extended through the horizontal section of said pipe into the retort, to about the center of the same, as shown.

The operation of these parts will be readily understood.

Oil from the tank K is conveyed to the retorts, and discharged therein, at a central point. In passing through the pipe $k^7$, the same is subjected to the action of the hot gases in the retort, and in the dip-pipe surrounding it, so that it is highly heated before final delivery. In consequence of this condition its inflow does not cool off the retorts materially, and it is consequently more quickly converted into gas, the cost of manufacturing thereby being lessened, and the quality of the product improved.

5. *The dip pipes and the first washer.*—L L, Figs. 2 and $2^a$, represent dip-pipes, by means of which the gas made in the retorts is delivered to the first washer box. These consists of a horizontal portion, $l$, which is provided at one end with a flange, $l^1$, adapted to form a connection with the neck of the retort, and, at the other, with a flange, $l^2$, to which is attached the blank or cover plate $k^8$, before described, and a vertical portion, $l^3$ which is provided below with a flange, $l^4$, adapted to rest upon the top of the washer-box for the double purpose of supporting the dip-pipe and forming a proper joint, and above, with a flange, $l^5$, having a removable cover, $l^6$, by means of which connection can be made with an upper pipe-section, if an upper series of retorts is employed.

M, Figs. 2 and 4, represents the first washer, consisting of an outer box, $m$, of proper form and size, and an inner box, $m^1$, set within the outer in an inverted position, the latter of which is provided with proper openings for receiving the dip and injector pipes, and also with transverse midfeathers or diaphragms $m^2$ $m^2$, extending downward nearly to the bottom, by means of which it is divided into three distinct gas-chambers, while free communication is left below for the movement of tar and other accumulations.

$m^3$ represents a hand-hole opening, and $m^4$ a drip-pipe, through which the accumulations of the washer and condensation-water from the injector are discharged into the basin $m^5$.

The operation of these parts will be readily understood.

The gas made in the retort passes through the dip-pipe into the chamber at each end of the washer, and from thence under the partitions, and through the liquid contained therein to the central chamber, while the tar and condensation-water flow off through the drip-pipe.

6. *The first injector.*—N, Figs. 2 and 4, represents the injector-pipe, consisting of a horizontal section, $n$, having a proper opening, $n^1$, for the injector-tube, an elbow, $n^2$, dipping into the first chamber of the second washer-box, and a vertical section, $n^3$, opening into the central chamber of the first washer-box, as shown.

$n^4$ represents a cock of any suitable construction, which is located at the proper point upon the injector-pipe, for the purpose of admitting air in proper quantities to dilute the gas.

$n^5$ represents an injector of any proper construction, which forms the termination of the live-steam pipe $I^{11}$ previously described.

The operation of these parts will be readily understood.

By the action of the injector a blast is created in the injector-pipe, and consequently a vacuum in the first washer-box, the dip-pipes, and the retorts.

By this means the gas, of course, is drawn out of these latter and is driven forward to the second washer-box.

By means of the cock which controls the supply of live-steam to the injector the power of the blast may be readily increased or diminished to correspond properly with the amount of gas coming forward from the retorts.

The steam, in addition to its exhausting action, serves also to soften the gas, or rather saturate its carbon and heavier particles, so that they are caused by gravity to return, to a greater or less extent, to the washer-box.

Atmospheric air is admitted in any desired quantity through the cock $n^4$, for the purpose of diluting the gas to the proper extent.

7. *The second washer.*—O, Figs. 2, 7, $7^a$, $7^b$, and $7^c$ represent the second washer, which is identical in construction with the first washer, with the exception that its interior is differently divided, and that the arrangement of the pipes is somewhat different.

$o$ represents a longitudinal partition, and $o^1$ $o^2$ transverse partitions, by means of which the inner box is divided into three distinct gas-chambers, as shown.

$o^3$ represents the water-line in the box, and $o^4$ the discharge end of the first injector-pipe opening below the water-line in the chamber $o^5$, as shown.

$o^6$ represents a circulation-pipe, one end of which opens into chamber $o^5$, above the water-line, and the other into the chamber $o^7$, below the water-line.

$o^8$ represents a similar pipe opening in chamber $o^7$, above the water-line, and in the chamber $o^9$, below the water-line, as shown.

$o^{10}$ represents an opening through which the gas in chamber $o^9$ is drawn off by the second injector.

The operation of these parts will be readily understood.

The discharge ends of the several pipes described open below the water-line, so that the gas is subjected successively to the action of the water, and thus properly washed.

8. *The second injector.*—P represents the injector-pipe, the vertical section $p$ of which communicates with the last chamber of the second washer, while its discharge end opens into the scrubber, as shown.

$p^1$ represents an air-cock, which is similar to that upon the first injector.

$p^2$ represents the injector, of any proper construction, which forms the termination of pipe $I^{10}$, previously described, supplies superheated steam from the chambers, as described.

By the action of this injector the gas is exhausted from the first washer, and is driven forward to the scrubber.

By means of the cock $p^1$ atmospheric air is admitted in proper quantities to further dilute the gas, if desired, this cock serving as an auxiliary to the first or main cock to supply any deficiency.

By means of the superheated steam the gas is further acted on to rid it of foreign matters, and it is again roasted by the intense heat to absolutely fix its condition as a permanent gas.

A certain quantity of hydrogen, also resulting from the decomposition of steam in the superheating-chambers, is here mixed with the gas by the injector, and the quality of the same much improved thereby.

9. *The scrubber.*—Q represents the scrubber, consisting of a vessel of any proper form and suitable size, which is provided with trays $q$ $q$, adapted to hold coke for the final purification of the gas.

$q^1$ represents the discharge-pipe leading to the gasometer, or to any other proper place.

The manner of using this part of the apparatus will be readily understood.

The gas exhausted from the second washer-box is driven by the injector through the scrubber to the gasometer, and, finally, purified by passing through the trays of coke.

10. *The fuel-injector.*—R represents a tank, of any proper form and size, which is provided with a discharge-pipe, $r$, having a cock, $r^1$, as shown.

$r^2$ represents an injector-pipe, the discharge end of which is properly located to deliver the material passing through it to the grate-bars, as shown.

$r^3$ represents an injector, forming the termination of a live-steam pipe, $r^4$, connected at any proper point with the steam-generators.

$r^5$ represents a funnel, opening below into the injector-pipe, which is suitably located to receive the contents of the tank R, as shown.

The operation will be readily understood.

The contents of the tank are delivered to the injector-pipe, and discharged by the action of the injector into the fire-chamber.

The operation of the apparatus as a whole will now be described.

Petroleum or other hydrocarbon is introduced from the oil-tank K into the retorts through the system of pipes described, and the same being heated on its way by the action of the hot gases in the dip-pipes and retorts is finally delivered to the latter at a central point, where it is most advantageously acted upon, and quickly made into gas. The gas thus made is drawn from the retorts on through the dip-pipes and first washer by the exhaust action of the first injector, and is delivered to the second washer.

By means of this exhaust action the gas is quickly withdrawn from the retorts to prevent excessive exposure to the intense heat, and the retorts themselves are relieved from undue pressure.

By means of this action also atmospheric air is drawn through the cock to dilute the gas. In addition to these advantages, resulting from the employment of steam in the manner described, a further advantage results from the softening influence of the steam, by means of which the heavier particles and impurities are saturated and thrown down into the washer-box.

The gas is drawn from the second wasner, and delivered through the scrubber to the gasometer by the action of the second injector.

By means of this action also the impurities are further acted on and thrown down into the second washer, and atmospheric air, if needed, is drawn in to further dilute the gas. In connection with this steam, also, more or less of hydrogen, formed in the superheating-chambers by the decomposition of steam, is introduced to increase the heating qualities of the gas, for the purpose of burning more perfectly the carbon.

Some of the advantages of the described construction are as follows:

The furnace is constructed in two main parts, *i. e.*, a base and superstructure, the former of which is essentially permanent in its character, and need never be materially disturbed, while the latter, containing those portions liable to be destroyed, is capable of be-readily dismantled, either in whole or in part, so that any worn out part may be replaced by new without material loss of time.

The furnace is constructed also of independent sectional parts adapted to fit together, so that it may be readily erected by unskilled labor. Its sections also are of such character that any suitable number of them may be grouped together to form a furnace of any desired size.

The special construction of the steam-generators is such that heat necessary to generate the steam is readily obtained from the furnace, a perfect circulation takes place throughout all parts of the system, and live and superheated steam may be readily obtained for the desired purposes.

The construction of the retorts is such that the parts most powerfully acted upon by the destructive forces are best adapted to resist such action.

The arrangement for delivering the oil to the retorts is such that the same is delivered in a highly-heated condition to the center of the retorts, when it is most advantageously acted upon by the heat, and most quickly made into gas.

By the employment of the injectors an exhaust action is obtained by simple and economical means, which are capable of ready and accurate adjustment.

On the other hand, the exhauster ordinarily employed in gas-works is not only expensive to construct, but its means for adjustment to regulate the intensity of its blast are imperfect.

By the employment of steam the gas is so perfectly acted upon to rid it of its impurities that only very small quantities of the latter ever pass beyond the washer, and then only such as are of light material, which then are perfectly caught in the scrubber, so that nothing passes into the pipes beyond, the same being entirely free from naphthaline or residuum of any sort.

By this simple and economical means, therefore, the fatal defects in ordinary oil-gas machines, *i. e.*, the deposition of naphthaline in the pipes, is entirely avoided.

I am aware that gas has been manufactured from hydrocarbon oil, and that hydrogen has been produced by the decomposition of steam, and the gas and hydrogen mixed together.

I am also aware that an exhaust apparatus has been employed in the manufacture of gas, and also steam in various ways; but

Having thus fully described my invention, what I claim as new, and desire to secure by Letters Patent, is—

1. In combination with the permanent masonry-base A, the superstructure, substantially as described, having sectional removable walls on every side, adapted to permit the removal of any desired part without disturbing the remainder, as set forth.

2. In combination with the permanent base A, the angle-iron frame-work and the sectional removable walls, substantially as described.

3. In combination with the sectional covering-plates, the sectional water-backs, substantially as described.

4. In combination with the sectional covering-plates and sectional make-up blocks, the removable retorts, substantially as described.

5. In combination with the permanent base, the sectional water-backs, the sectional make-up blocks, and the sectional covering-plates, substantially as described.

6. In combination with the permanent base, the sectional water-backs, the sectional make-up blocks, the retorts, and the sectional covering-plates, substantially as described.

7. The steam-generating system described, consisting essentially of the sectional water-backs, the stand-pipes, the connecting branches, and the supply-tank, substantially as described.

8. In combination with the water-backs and stand-pipes, the connecting-pipes and the superheating-chambers, substantially as described.

9. In a gas apparatus, the combination of the following elements: A water-bridge, water-backs, stand-pipes, and superheating-chambers, substantially as described.

10. In combination with the water-backs and the superheaters, the pipes $I^9$ $I^{10}$, supplying live and superheated steam to the first and second injectors, substantially as described.

11. In combination with the relatively-fixed dip-pipe, the plate $k^8$ and the pipe-length $k^7$, passing through the dip-pipe, substantially as described, the plate and pipe-length being adapted for removal without disturbing other parts, substantially as described.

12. In combination with the dip-pipe, the pipe-length $k^7$ passing through the dip-pipe, and having the siphon-pipe $k^6$ and the removable plate $k^8$, as described.

13. The triangular retort J, having an excess of metal on the angle-lines and on the central portion of the faces, as described.

14. In combination with a retort, a dip-pipe and a washer, an injector-pipe and injector, substantially as described, located beyond the washer, and adapted to exhaust the gas therefrom, as set forth.

15. In combination with the retorts, dip-pipes, and first washer, the injector-pipe, injector, and second washer, as described.

16. In combination with an exhaust apparatus and a first or main air-cock, a second or auxiliary air-cock, substantially as described, adapted to supplement the action of the first.

17. In combination with a gas-furnace water-backs, arranged on either side of the retort-chamber, divided up horizontally into compartments connected by stand-pipes, and having their inner faces extending upward and inward, to throw the products of combustion against the retorts, as herein set forth.

18. In the furnace A, the combination therewith of the water backs connected by the water-bridge, and communicating with the water-tank by pipe $I^{12}$, inlet-pipe $I^3$, and stand-pipes $I^5$, for the purpose of securing perfect equilibrium, as herein set forth.

19. The combination of furnace A with retorts J, washer M, second washer or purifier O, scrubber Q, oil-tank K, and water-tank I, all constructed, arranged, connected together and operating substantially in the manner and for the purpose set forth.

20. The described method of treating gas consisting essentially in subjecting it successively to the action of live and superheated steam.

21. The method described of making gas, consisting essentially in decomposing oil in a retort, and subjecting the products successively to the action of live steam and a mixture of superheated steam and hydrogen.

22. The described method of treating gas, consisting essentially in subjecting the products of the retorts to the following steps: first, to the action of a washing agent; second, to the action of live steam as a softening agent; third, to the action of a second washing agent; and, fourth, to the action of superheated steam as a drying agent.

This specification signed and witnessed this 13th day of March, 1877.

JAMES RIGBY.

Witnesses:

HARRY C. CLARK,
U. E. STALLINGS.